April 19, 1927. 1,625,087
R. S. McCLINTOCK
COTTON CHOPPER
Filed Oct. 2, 1923
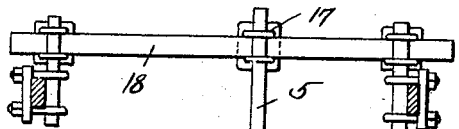
Fig.1.
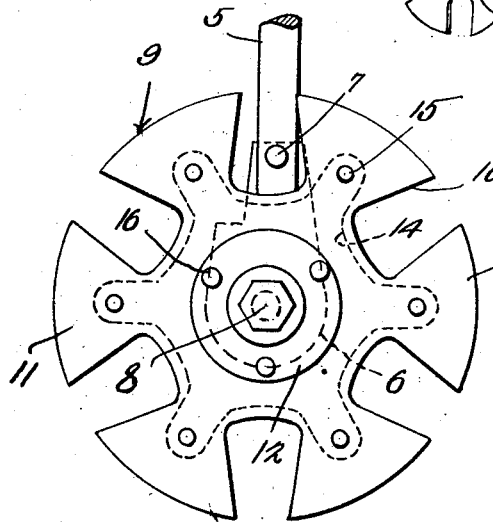
Fig.2.
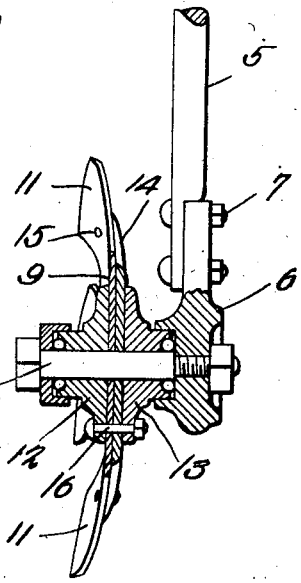
Fig.3.
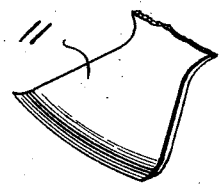 
Fig.4. Fig.5.
R.S. McClintock Inventor
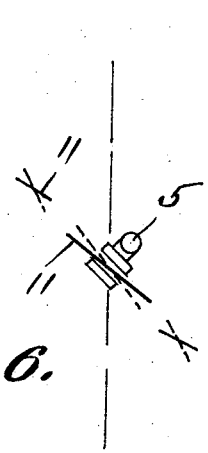
Fig.6.
By C.A. Knowles
Attorneys Patented Apr. 19, 1927.

1,625,087

UNITED STATES PATENT OFFICE.

ROBERT S. McCLINTOCK, OF MARIANNA, ARKANSAS, ASSIGNOR OF ONE-HALF TO WILLIAM S. McCLINTOCK, OF MARIANNA, ARKANSAS.

COTTON CHOPPER.

Application filed October 2, 1923. Serial No. 666,170.

The present invention has reference to agricultural machines, and more particularly cotton choppers, the primary object of the invention being to provide cotton chopping means which may be readily and easily substituted for the usual disks or blades of a harrow, whereby the harrow may operate efficiently, as a cotton chopper.

An important object of the invention is to provide disk-like members having cut out portions formed therein to provide a plurality of blades, the blades being constructed to operate with a shearing or scraping action.

Another object of the invention is to provide a device of this character which will be rotated to accomplish the purpose of the invention, by its contact with the ground surface over which the same is moving.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawings:

Figure 1 is an elevational view disclosing the gang supporting bar of a cultivator supplied with a device constructed in accordance with the present invention.

Figure 2 is an elevational view disclosing one side of the device.

Figure 3 is a vertical sectional view through the disk-like member.

Figure 4 is a perspective view of one of the blades of the device.

Figure 5 is a perspective view of a modified form of blade.

Figure 6 is a diagrammatical view disclosing the angle at which the disk-like member operates with respect to the direction of draft.

Referring to the drawing in detail, the reference character 5 designated a supporting arm which is shown as bolted to the head 6 as at 7.

The head 6 is formed with a suitable opening to accommodate the shaft 8 on which the disk-like member 9 is supported, the member 9 being supplied with suitable bearings to permit the same to rotate freely on the shaft.

This disk-like member is formed preferably of sheet metal and as shown is provided with a plurality of cut out portions 10 defining blades 11 that are designed to contact with plants under cultivation to remove the same. Forming a part of the device are the hub members 12 and 13 that reinforce the disk-like member at the central portion thereof. Positioned between the hub members 12 and 13 is a spider 14 that is bolted to the disk-like member at 15 reinforcing the blades 11.

The hub members are also secured to the spider by means of the bolts 16 that pass through suitable openings in the hub members, spider and disk-like member. Thus it will be seen that due to this construction, an exceptionally rigid structure is provided and one which will be permitted to rotate freely on its supporting shaft.

The outer edges of the blades 11 are beveled to provide cutting surfaces and are slightly twisted so that one edge of one blade will be offset with respect to the adjacent edge of the preceding blade. As clearly shown by Figures 4 and 5 of the drawing, the outer edges or cutting edges of the blades curve outwardly presenting scraping surfaces to insure the device operating to scrape or cut the plants to be removed.

Spaced U-bolts indicated at 17 cooperate with the supporting iron 5 to secure the device to the usual gang supporting bar 18 of a cultivator, whereby the disk-like members may be adjusted in a horizontal plane to cause the blades to operate at various angles with respect to the line of draft of the cultivator supporting the same.

The blades as shown by Figures 4 and 5 of the drawing are constructed in such a manner that as the disk is moved over the ground surface, the disk will, by its contact with the ground surface rotate and accomplish the chopping result.

In the operation of the device it is contemplated to support the disk-like body portion at an angle with respect to the line of draft as clearly shown by Figure 6 of the drawing, whereby forward movement of the cultivator supporting the device, will cause the disk-like member to rotate on its shaft and at the same time set up a shearing or scraping action to remove growing plants.

As the disk-like body portion rotates, it will be obvious that such rotation, being at an angle with respect to the row of plants under cultivation, the openings formed in the disk will allow certain plants to pass through the blade, to the end that certain plants of a row will be left standing, while the plants falling in the paths of travel of the blades 11 will be removed from the ground surface.

I claim:

A cotton chopper including a sectional hub, a spider, a disk-like cutting member having cut out portions defining blades, said disk-like cutting member and spider being supported between the sections of the hub, the rear cutting edges of the blades of the cutting member being curved outwardly and having their outer edges beveled to provide cutting surfaces, bolts passing through the hub sections, spider and disk-like cutting member to removably secure the spider, cutting member and hub sections together, said hub sections having extensions providing bearings, said chopper having a central opening, and a shaft extended through the opening and on which the chopper rotates.

In testimony that I claim the foregoing as my own, I have hereto affixed my signature.

ROBERT S. McCLINTOCK.